(12) United States Patent
Cho et al.

(10) Patent No.: US 9,098,407 B2
(45) Date of Patent: Aug. 4, 2015

(54) METHODS FOR AUTOMATICALLY RETRIEVING ELECTRONIC MEDIA CONTENT ITEMS FROM A SERVER BASED UPON A READING LIST AND FACILITATING PRESENTATION OF MEDIA OBJECTS OF THE ELECTRONIC MEDIA CONTENT ITEMS IN SEQUENCES NOT CONSTRAINED BY AN ORIGINAL ORDER THEREOF

(75) Inventors: Peter Cho, San Francisco, CA (US); Charles M. MacInnis, San Francisco, CA (US); Robert Cromwell, Seattle, WA (US); Joshua Forman, San Francisco, CA (US); Anne Halsall, San Francisco, CA (US); Jonathan Wight, Emeryville, CA (US); Kevin Ballard, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 436 days.

(21) Appl. No.: 12/911,247

(22) Filed: Oct. 25, 2010

(65) Prior Publication Data
US 2012/0102395 A1    Apr. 26, 2012

(51) Int. Cl.
G06F 17/00 (2006.01)
G06F 15/02 (2006.01)
G06F 3/0485 (2013.01)

(52) U.S. Cl.
CPC ........ G06F 15/0291 (2013.01); G06F 3/04855 (2013.01); *Y10S 715/973* (2013.01)

(58) Field of Classification Search
CPC   G06F 3/04855; G06F 3/0485; G06F 15/0291

USPC ................... 715/273, 277, 200–203
See application file for complete search history.

(56) References Cited

U.S. PATENT DOCUMENTS

| | | | | |
|---|---|---|---|---|
| 5,479,600 A * | 12/1995 | Wroblewski et al. | ......... | 715/787 |
| 5,945,998 A * | 8/1999 | Eick | .............. | 345/589 |
| 6,049,334 A * | 4/2000 | Bates et al. | ................... | 715/755 |
| 6,404,978 B1 * | 6/2002 | Abe | .............. | 386/281 |
| 6,738,787 B2 * | 5/2004 | Stead | .............. | 715/830 |
| 7,958,017 B1 * | 6/2011 | Rempe et al. | ............... | 705/26.1 |
| 8,244,697 B2 * | 8/2012 | Brannon et al. | ............. | 707/695 |
| 2002/0030697 A1* | 3/2002 | Oikawa | ......... | 345/707 |
| 2002/0033850 A1* | 3/2002 | Bates et al. | .................. | 345/853 |
| 2002/0186252 A1* | 12/2002 | Himmel et al. | ............... | 345/787 |
| 2004/0085364 A1* | 5/2004 | Keely et al. | ................... | 345/804 |
| 2004/0133847 A1* | 7/2004 | Iino et al. | .................. | 715/500 |
| 2006/0115803 A1* | 6/2006 | Kalisiak | .................. | 434/323 |
| 2007/0055926 A1* | 3/2007 | Christiansen et al. | ........ | 715/512 |
| 2007/0067297 A1* | 3/2007 | Kublickis | ........................ | 707/9 |
| 2007/0101373 A1* | 5/2007 | Bodlanender et al. | .......... | 725/86 |
| 2007/0192729 A1* | 8/2007 | Downs | ........................ | 715/786 |

(Continued)

*Primary Examiner* — Scott Baderman
*Assistant Examiner* — Benjamin J Smith
(74) *Attorney, Agent, or Firm* — Ascenda Law Group, PC (57) ABSTRACT

A method for use with an electronic reading device comprising automatically fetching electronic media content and automatically and dynamically sequencing portions of the electronic media content for display on an electronic reading device. Optionally, the electronic media content can be automatically and dynamically divided into the portions that are then sequenced. Optionally, the electronic media content can be re-sequenced to reflect user preferences and needs. Various methods for recognizing and altering the display of the electronic reading device quickly and efficiently are disclosed.

13 Claims, 8 Drawing Sheets

(56) References Cited

U.S. PATENT DOCUMENTS

| | | | |
|---|---|---|---|
| 2007/0234194 A1* | 10/2007 | Tsuchiya et al. | 715/500.1 |
| 2007/0250901 A1* | 10/2007 | McIntire et al. | 725/146 |
| 2008/0148149 A1* | 6/2008 | Singh et al. | 715/700 |
| 2008/0158261 A1* | 7/2008 | Gould | 345/666 |
| 2008/0250350 A1* | 10/2008 | Chen et al. | 715/810 |
| 2008/0250358 A1* | 10/2008 | Mitchem et al. | 715/855 |
| 2008/0275974 A1* | 11/2008 | Rackiewicz | 709/223 |
| 2009/0100376 A1* | 4/2009 | Patel et al. | 715/810 |
| 2009/0158342 A1* | 6/2009 | Mercer et al. | 725/46 |
| 2009/0172558 A1* | 7/2009 | Pickens et al. | 715/741 |
| 2009/0241054 A1* | 9/2009 | Hendricks | 715/776 |
| 2009/0305006 A1* | 12/2009 | Steffen | 428/195.1 |
| 2009/0317056 A1* | 12/2009 | Hu et al. | 386/83 |
| 2010/0011315 A1* | 1/2010 | Araki | 715/783 |
| 2010/0131886 A1* | 5/2010 | Gannon et al. | 715/786 |
| 2010/0185933 A1* | 7/2010 | Coffman et al. | 715/230 |
| 2010/0251281 A1* | 9/2010 | Craner | 725/23 |
| 2010/0315359 A1* | 12/2010 | Seong et al. | 345/173 |
| 2011/0050591 A1* | 3/2011 | Kim et al. | 345/173 |
| 2011/0050594 A1* | 3/2011 | Kim et al. | 345/173 |
| 2012/0077155 A1* | 3/2012 | Siani | 434/156 |
| 2012/0206472 A1* | 8/2012 | Kandekar et al. | 345/581 |
| 2012/0221436 A1* | 8/2012 | Patterson et al. | 705/26.41 |

* cited by examiner

METHODS FOR AUTOMATICALLY RETRIEVING ELECTRONIC MEDIA CONTENT ITEMS FROM A SERVER BASED UPON A READING LIST AND FACILITATING PRESENTATION OF MEDIA OBJECTS OF THE ELECTRONIC MEDIA CONTENT ITEMS IN SEQUENCES NOT CONSTRAINED BY AN ORIGINAL ORDER THEREOF

FIELD OF THE INVENTION

This invention relates generally to methods for dynamically and automatically sequencing electronic media content on an electronic reading device and configuring a novel display to efficiently inform a reader of his or her position within the electronic media content.

BACKGROUND OF THE INVENTION

As the use of personal computing devices to read and view content becomes more commonplace, there is a growing need for providing consumers with rich, interactive content, including learning content. The current generation of electronic reading technology remains relatively limited in its ability to dynamically manipulate and modify the content and its presentation to the user in accordance with the individual user's preferences and needs. Current electronic reading technology often follows too closely the traditional constraints of paper-based content. These limitations may not be as pronounced when the electronic media content is a typical popular book such as a novel, since those works are normally intended to be read in linear fashion, start-to-finish. However, for more complex media content such as educational material, it would be advantageous if electronic reading technology could be created with more powerful mechanisms to dynamically modify the sequencing and other presentational aspects of content. Users, particularly in the educational context, can benefit greatly from content whose presentation adapts to their needs, rather than traditional content which constrains how and where users can learn.

SUMMARY OF THE INVENTION

The present invention includes novel methods for adapting electronic media content, including educational electronic media content, to an electronic reading device. These methods provide students, instructors, and other users with mechanisms for compiling electronic content from multiple sources, including fetching from remote sources if and as needed, and dynamically sequencing such content in accordance with more individualized learning goals. The present invention addresses deficiencies of traditional textbooks and educational content by consolidating an entire course's materials, regardless of the media's type or origin, in an easily accessible and orderly source and adapting the sequence and content of the materials according to, for example, a reading schedule or course syllabus, and/or a user's completion of reading assignments and performance on assessments. The present invention also provides users with mechanisms for quickly perceiving and efficiently manipulating the location of the currently displayed reading material within the overall set of content.

Embodiments of the invention described herein contemplate use of an electronic reading device, connected via a network to one or more remote computer servers, to access and view educational electronic media content. Methods in accordance with the invention include:

(i) automatically accessing the educational electronic media content from the remote computer servers (if not already stored locally on the device) in accordance with an input reading list, where the educational content comprises a plurality of media objects; and (ii) automatically and dynamically sequencing the plurality of media objects for presentation on the electronic reading device, based in part on a sequence specification that is independent of (in the sense of not being constrained to be the same as) an original viewing sequence (e.g., in an original textbook version) for media objects of the educational electronic media content. This sequencing (or re-sequencing) of the media objects for presentation on the electronic reading device can be dependent, in some embodiments, upon an input sequence specification (e.g., a reading schedule or course syllabus), explicit user input, and/or upon observed interaction of users with the electronic content using the device (e.g., completion of all or part of a reading assignment, user responses to interactive assessment questions, popularity of the materials with users).

Additional features of the present invention, in some embodiments, provide users, including instructors, with mechanisms for choosing the size and content of the media objects which undergo automatic and dynamic ordering. This can further un-tether an instructor's teaching methods and styles from those set by a publisher, for example. To this end, a further aspect of the invention, in some embodiments, comprises automatically and dynamically dividing the educational electronic media content into a plurality of media objects in a manner that is not absolutely constrained to be the same as a publisher's original division of content into particular sections and pages.

Other aspects of the present invention, in some embodiments, can help facilitate learning by providing users with the ability to quickly and efficiently understand context and navigate rapidly through content without sacrificing readability. These other features include providing a first view and a second view for the display of content on the electronic reader, with a user being allowed to navigate between the first view and the second view, where the first view facilitates interactive navigation by the user within media objects, and the second view facilitates transition by the user among the plurality of media objects. Further, related features in some embodiments include displaying, together with the first and/or second view, simple visual representations of the context for currently displayed content, including graphical representations of: the sequence of the media objects, the relative length of the media objects, and the location of the currently displayed content within the overall sequence and/or within the current media object—for example, depicted graphically by indicators on a displayed spine.

For the purposes of briefly summarizing this invention in an illustrative manner, certain aspects, features, and potential advantages of the invention have thus been described. It is to be understood that such aspects and features may not necessarily be present, nor all such advantages achieved, in every embodiment of the invention. The scope of the invention is rather to be defined in accordance with the claims as set forth in the final section below and as may ultimately be issued hereon.

DETAILED DESCRIPTION OF THE INVENTION

Figure 1:
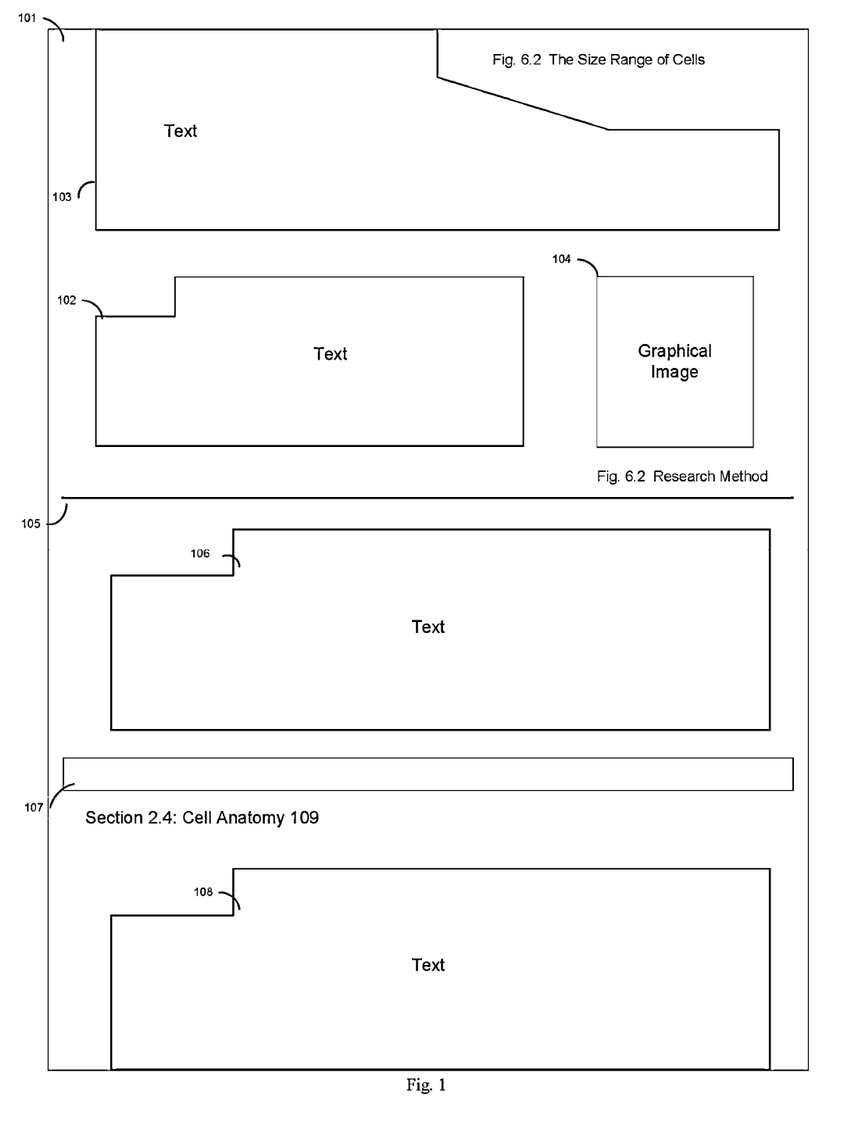
FIG. 1 illustrates an electronic version of a textbook, such as may be used with embodiments of the present invention.

FIG. 1 illustrates an example of electronic media content—in particular, an electronic textbook—that may be enhanced advantageously in accordance with embodiments of the present invention, as will be described further below. Particularly FIG. 1 shows a screen-shot of the display of a portion of the electronic version of a textbook 101. The display shows a user a portion of a preceding paragraph 103 and the next whole paragraph 102. Similar to the paper version of the textbook, the electronic version shows a graphical image 104 that complements that content of the adjoining paragraph 102. The display 101 also shows the transition to a new section of the textbook 107. This new section 109 begins a new topic for the student to learn 108. The display also shows the transition between subsections of the textbook 105. This can also represent the pagination in the paper version of the textbook. In that case, paragraph 106 would begin on the following page.

With traditional electronic reading devices, the student's learning experience using such a display is relatively static and linear, and the student is typically also limited to viewing only the single media source's content at once. (This may be why traditional electronic reading devices have so far primarily been successful only with novels and other simple linear media.) Additionally, if sections are sufficiently long, a student would not be able to efficiently find the next section of the book. As described below, preferred embodiments of the present invention include features to overcome these limitations.

Overview

Figure 2:
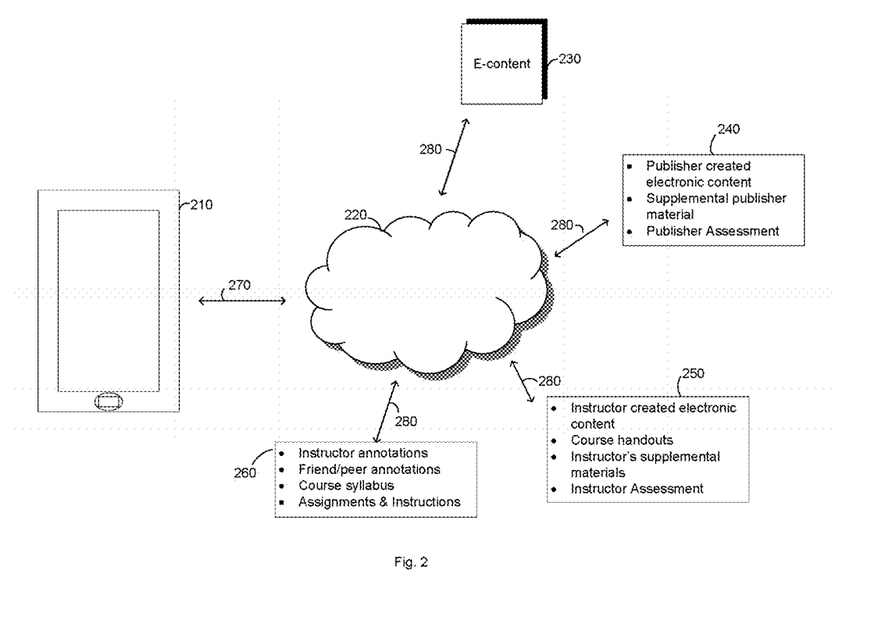
FIG. 2 illustrates an embodiment of mechanisms by which an electronic reading device fetches electronic media content.

In an embodiment of the present invention, as illustrated in FIG. 2, an electronic reading device 210 is in communication 270, 280 with a plurality of other electronic devices, including network facilities providing network servers and network storage 230-260, via network (or "cloud") 220. For example, U.S. patent application Ser. No. 12/731,656, System and Methods for Reading Location Awareness (MacInnis, et al.), whose teachings are incorporated herein by reference in their entirety, describes one such networked electronic reading device that may be used in preferred embodiments of the present invention. Electronic reading device 210 may be owed by each student in a course, and may be used as described in detail below for interactive display of electronic media content for the course. Network facilities 230-260 act as remote computer servers and are sources of electronic media content; in practice they may be electronic reading devices of other students or the instructor, a publisher's or university's databases or servers, and/or any other sources of the required electronic media content. (General technology enabling network-based communication among electronic devices is well known to skilled practitioners and is not the focus of the present invention.)

Figure 3:
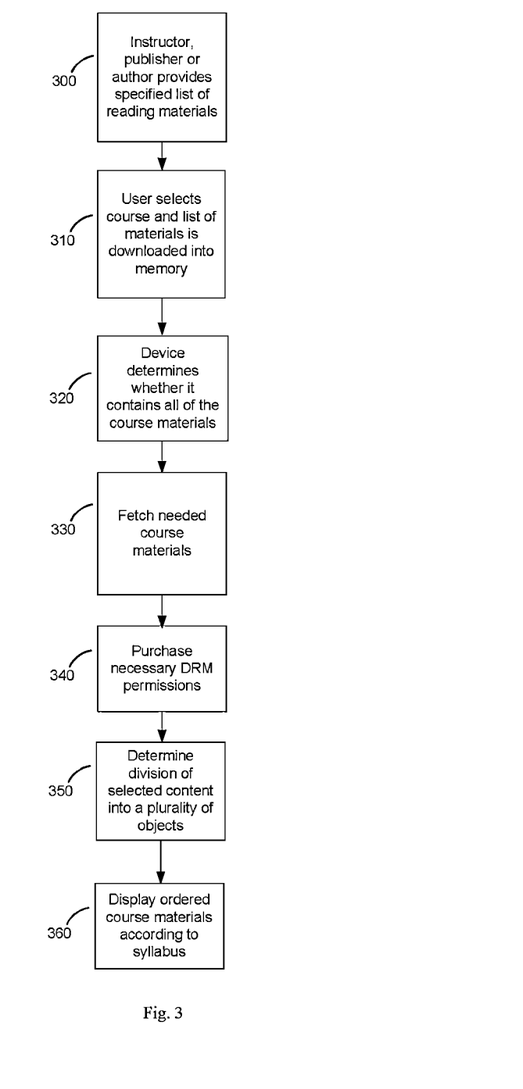
FIG. 3 illustrates a flowchart of operations for fetching, dividing, and sequencing electronic media content in accordance with an embodiment of the present invention.

FIG. 3 illustrates a flowchart of high-level operations for retrieving and displaying selected electronic media content in an embodiment of the present invention. In this preferred embodiment, at step 300, an instructor, publisher, or other author provides a specified list of reading materials corresponding to a particular class or course of study; this list is stored at network storage 230, preferably as part of an online course profile. At step 310, a student selects the course using electronic reading device 210, and the list of materials is downloaded into the device's memory. Then, at step 320, device 210 automatically determines which, if any, of the listed materials, are not already present in the device's memory, or for which a license to view the materials is required and has not yet been obtained. For those materials, in steps 330-340, device 210 will download the specified content and/or obtain licenses for its viewing from network storage 230-260. Preferably, device 210 automatically performs this process of fetching requisite materials, and a student would only be required to authorize any charges incurred for obtaining access to the requisite materials. At step 340, if the requisite materials are protected by digital rights management, then device 210 preferably purchases the necessary rights/permission for the user, with the user's authorization. In step 350, device 210 determines a division of the selected electronic media content into a plurality of media objects. In step 360, device 210 dynamically determines a sequence of the plurality of media objects for sequential presentation to the user.

Details and variations regarding this process are described below.

Diverse Sources and Types of Content

The illustrative diagram of FIG. 2 contemplates primary sources hosted in storage 230, such as (for the educational field) a textbook, a novel, a workbook, or other primary sources of course materials. A publisher of primary sources may also create certain supplemental material—depicted here in storage 240—such as updates, supplements, workbooks, assessments, practice tests, sample tests, videos, articles, and other assorted media that the publisher believes can supplement that student's learning experience. An instructor's supplemental content is depicted here in storage 250, which similarly includes materials that the instructor believes will supplement the student's learning experience. Logistical and customized materials are depicted in storage 260. Logistical material can include the course syllabus, assignments, and instructions. Customized materials may include the instructor's or a student's notes, annotations corresponding with other course materials, data about how others have used the content, or supplemental media that piqued their interests. In the preferred embodiment herein, all of the above materials can be listed or otherwise identified as described above in connection with step 300, and then fetched and compiled automatically via the students' electronic reading devices 210 in accordance with steps 310-340.

Figure 4:
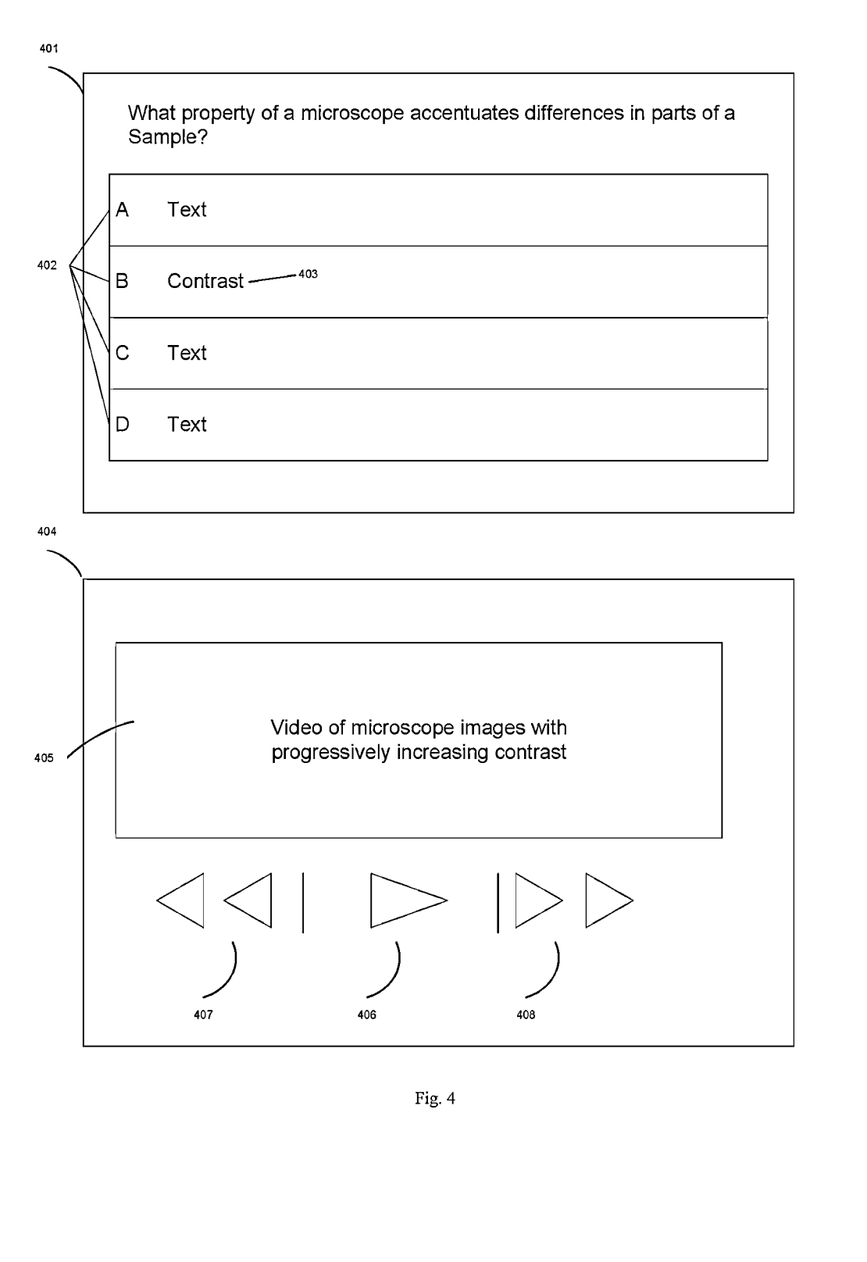
FIG. 4 illustrates examples of supplemental electronic media content (and in particular, assessments and videos) that may be used in preferred embodiments of the present invention.
Figure 5:
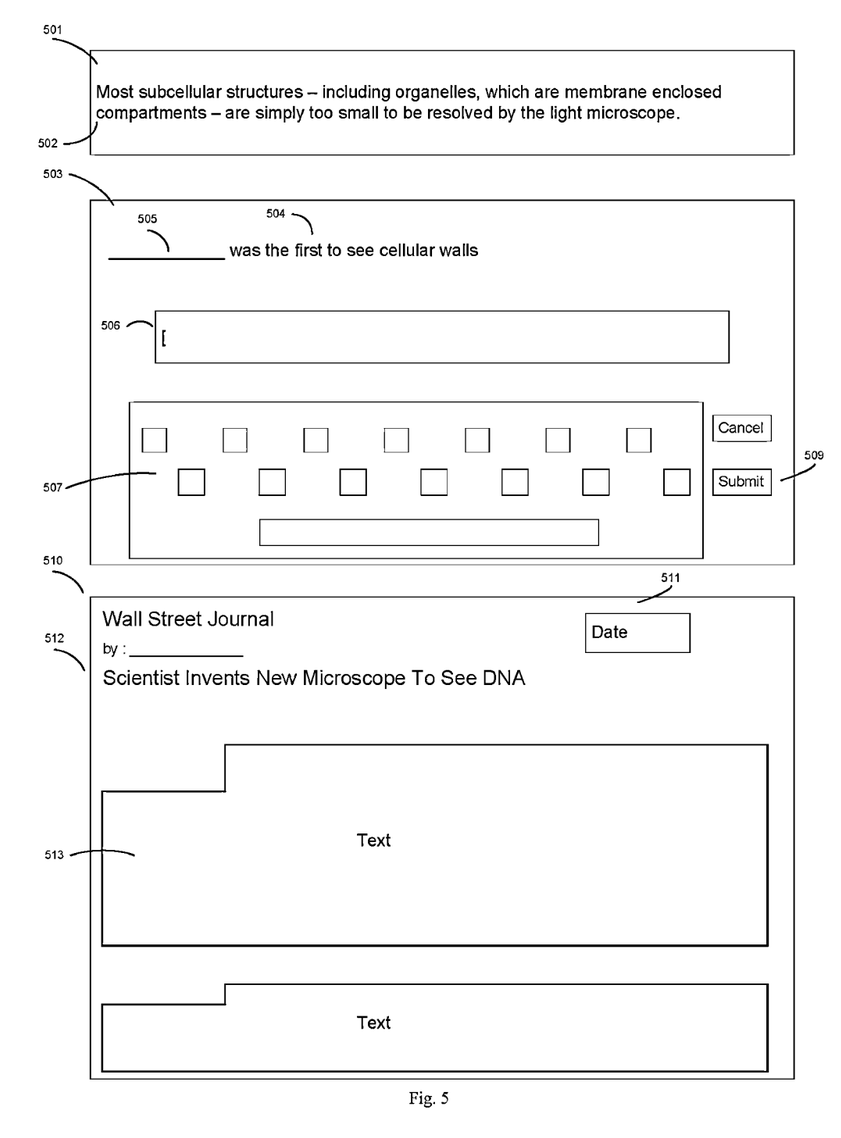
FIG. 5 illustrates examples of electronic media content authored by an instructor or student (in particular, annotations, assessments, and supplemental articles) that may be used in preferred embodiments of the present invention.

FIGS. 4 and 5 illustrate examples of several of the types of supplemental electronic media content referenced above. In FIG. 4, assessment 401 is an example of a multiple choice question. The student is presented with a plurality of possible answers 402 from which he or she must select; the correct answer in this example is 403. If the electronic reading device has a touchscreen, the student can answer the question by touching the screen to select the applicable response. Otherwise, other inputting mechanisms can be employed such as the use of buttons or a keyboard. Additionally, skilled practitioners may find it useful to provide a gesture-based interface (using e.g., a touchscreen or camera to capture the user's gestures), as known in the field, to facilitate user interaction. Voice recognition is also an input mode that practitioners may find suitable for some applications of the present invention. FIG. 4 also shows an example of supplemental video content 404. When played 406, video 405 will show the image one would see through a microscope as contrast is progressively increased. If multiple videos are available, the media player can provide a mechanism 407, 408 for jumping between discrete video clips.

FIG. 5 illustrates examples of supplemental electronic media content authored by an instructor or student. First, an annotation 501 is illustrated. An annotation is generally a context specific comment designed to supplement other materials. It can comprise, among other things, the most important portions of an instructor's notes 502, clues to answers for assessments, insights, or statements designed to arouse student interest in further research. Second, an instructor generated assessment 503 is illustrated. This assessment 503 is an example of a fill-in-the-blank question. A statement or phrase 504 is displayed, with one or more words removed 505. The student is then prompted 506 to complete the statement or phrase. A student's response can be entered using e.g., any one or more of the illustrative input modes references above, such as typing on a keyboard 507, gesturing with a touchscreen, and/or using voice-recognition software to process spoken input. The assessment may then provide the student with a mechanism for submitting the response to the electronic device 509. The response can then be stored on the electronic reading device or uploaded to a server. It should be noted that not all assessments need to be in question format. As non-limiting examples, assessment games or visual-spatial interactions are also contemplated by the present invention.

Third, the instructor can select particularly pertinent articles 510 or external links for inclusion in the course materials. This enables the instructor to keep the class as up-to-date as possible 511. The article's headline 512 or its content 513 can be used to greatly supplement a student's learning experience over a static textbook by grounding classroom experience in the outside world.

Object Division

After the selected electronic media content is fetched in steps 330-340, it can be automatically and dynamically divided into a plurality of media objects at step 350. This makes it possible for the electronic reading device 210 to subsequently perform operations on the media objects such as re-sequencing their display in a customized fashion. A media object can be any portion of the electronic media content. Non-limiting examples of media objects include any one or more of: textbooks or portions thereof, sections of text, numbers, equations, assessments, questions, articles or portions thereof, pictures, photographs, illustrations, figures, images, objects that can be manipulated, videos, animations, sequences of images, 3-D objects, audio files, and annotations.

Preferably, the division into discrete media objects as step 350 is determined automatically by a set of computer instructions which is written to recognize the metes and bounds of portions of the electronic media content. The determination is preferably based on semantic metadata delivered with the electronic media content as provided by the author, publisher, another user or other subject matter expert to identify sensible media object boundaries. Additionally, an instructor (or others) can preferably provide input to manually edit the metes and bounds of the individual media object, add more media objects, change the order of the objects, or delete some media objects. The determination preferably takes into account a user's inputs, both explicit (preferences input by the user) and implicit (observed user behavior). This allows for the division to be custom-made to fit the instructor and/or user's preferences and needs. Thus, for example, the determined division of the electronic media content is preferably not absolutely constrained by the publisher's original division of text into particular sections and pages. Moreover, the division is preferably dynamic: in the event that the inputs for determining the division of media objects change based on instructor, student, or other updates, then electronic reading device 210 will make an updated determination, and the display of device 210 will be dynamically adapted to reflect these updates.

Sequencing

In the illustrative embodiment, after the selected electronic media content is fetched and divided into the plurality of media objects, at step 360 the plurality of media objects is automatically and dynamically sequenced for display on electronic reading device 210. Preferably, the sequence determined in this step is not constrained by the ordering of content in its original format. For example, even if an original textbook discusses the principles of sine and cosine after the Pythagorean theorem, step 360 might nevertheless determine, based on all of the criteria considered, that sine and cosine content should be displayed before the Pythagorean theorem is mentioned. Here, the determination is preferably based on input including a syllabus or lesson plan provided by the instructor, and preferably also takes into account a user's inputs, both explicit (preferences input by the user) and implicit (observed user behavior), so that the sequence is customized to fit the instructor and/or user's preferences and learning needs. The determination may also reflect general pedagogical principles. A detailed illustration in accordance with a preferred embodiment of the present invention is described below in connection with FIG. 7.

The determination of sequence is preferably dynamic: as instructor, student, or other inputs are updated, electronic reading device 210 will reassess the sequence and dynamically adapt the display of content accordingly. Moreover, in a preferred embodiment of the present invention, the sequencing input includes input that is conditional in nature, e.g., "If X then Y," where X is a certain pre-requisite event and Y represents a corresponding re-sequencing of the plurality of media objects. The re-sequencing is automatic and dynamic in that if the electronic reading device senses that condition X has been met, then the plurality of media objects will be automatically re-sequenced and the display will be dynamically updated to reflect this re-sequencing.

In many instances, the re-sequencing specification can logically depend on non-substantive portions of the electronic media content. For example, the re-sequencing specification can be dependent upon a reading schedule or a class syllabus contained within the electronic media content. This reading schedule can also be customized by the student himself. However, even if the re-sequencing specification depends in part on the electronic media content, it can also depend on other conditions. Re-sequencing could be conditioned on the passing of a certain date or time. The re-sequencing could then create a display of a certain week's reading assignment once that day arrives. This has the advantage of precluding the student from needing to compare what he or she is reading with the specific reading assignment. A student could simply activate the display and feel comfortable that he or she is reading the correct material for that time period, with automatic remediation based on observed performance on assessment or other historical performance data specific to the user. As a more specific example, the re-sequencing can be conditioned on a student's failure to comply with the reading schedule. The re-sequencing, then, can adjust the display so that the student will finish the reading assignment first, before the display shows the following time period's assignment. This type of re-sequencing can simplify a student's schedule and his or her logistical burden in tracking assignments and calendars. It also ensures that students stay on top of the course's reading assignments and efficiently presents students with their unread materials.

The re-sequencing can also be dependent on a user's interaction with the electronic reading device. For example, the re-sequencing can be conditioned on a user's interest level in the educational electronic media content, annotations regarding such content, or the user's responses to interactive assessment questions included in such content. These assessment questions can be authored by the author, publisher, instructor, or other students. For example, if a student incorrectly answers a particular assessment, that assessment question can be re-sequenced such that it is displayed later in the material. Spaced, repeated exposure to information has long been known to increase information retention in a learner in sharp contrast to "cramming" before an examination. R. Bjork, Information-processing analysis of college teaching, Educational Psychologist, Vol. 14 (1979), pages 15-23. Another example is if a student correctly answers a certain percentage of assessments on a particular topic or achieves a certain score on a quiz or exam, then the material can be re-sequenced such that assessment questions testing that topic will not appear as frequently in the display. Additional supplemental materials can be also made available to more advanced students. Such re-sequencing exemplifies the adaptation contemplated by the present invention. Traditional methods of providing media content are inefficient in that they are unresponsive to the unique needs of individual students. The present invention can tailor each student's learning experience to his or her individual needs and interests. Thus, the learning experience of a student who struggles with trigonometry will differ from the student who struggles with graphing mathematical functions. A student who excels will be given opportunities to take his or her study further. A remedial student will receive the particularized and individualized attention he or she requires.

Figure 6:
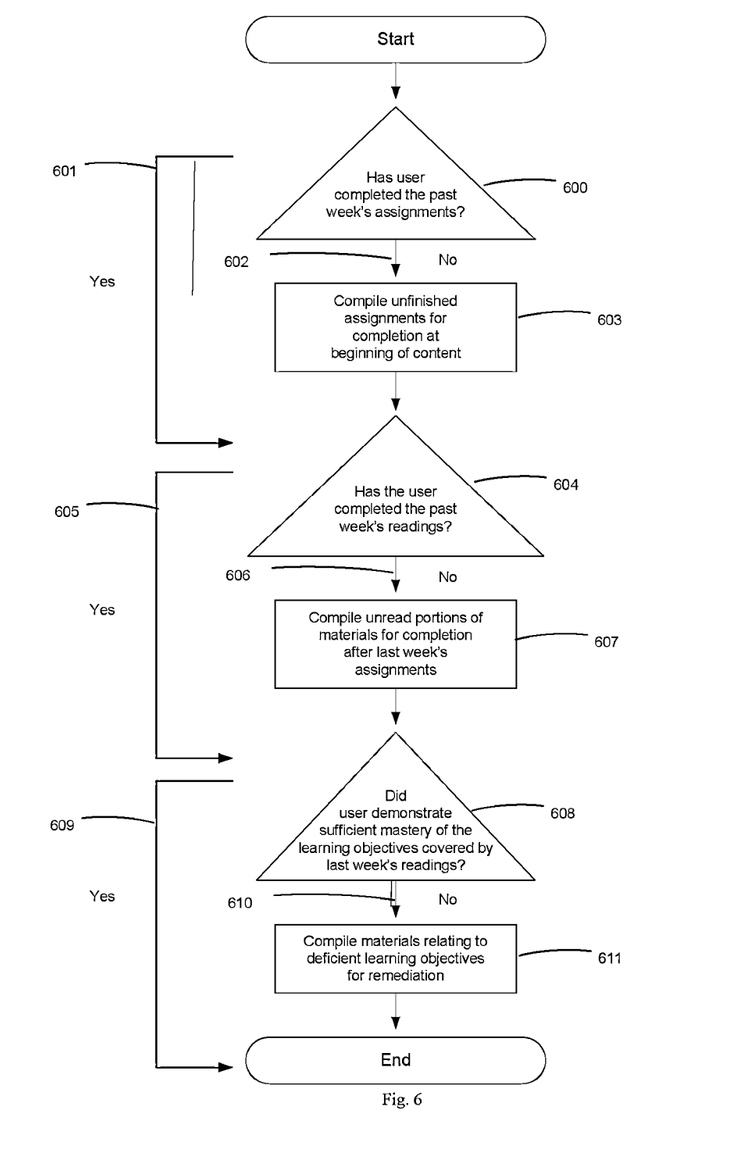
FIG. 6 illustrates one embodiment of a flowchart of operations for automatically and dynamically re-sequencing the plurality of media objects.

FIG. 6 is illustrative of one embodiment of a re-sequencing procedure. First, the electronic reading device queries whether the user completed the prior week's assignments 600. If so, nothing is re-sequenced 601. If not, 602 the electronic reading device will compile the unfinished portions of the assignments and re-sequence them at the beginning of the content for the new week 603. Second, the electronic reading device queries whether the user completed the prior week's readings 604. If so, nothing is re-sequenced 605. If not, 606 the electronic reading device will compile the unread portions of the reading and re-sequence them after the unfinished assignments and before the content for the new week 607. Third, the electronic reading device will query whether the user correctly answered sufficient questions related to each section of the prior week's reading 608 (the sufficiency standard can be arbitrarily set). If so, nothing is re-sequenced 609. If not, 610 then the electronic reading device will compile materials related to the incorrectly answered questions and re-sequence them such that the user will review them during the new week 611. The above examples are meant to be non-limiting and one skilled in the art would recognize other appropriate re-sequencing responses to student or user interactions.

Detailed Illustration

Figure 7:
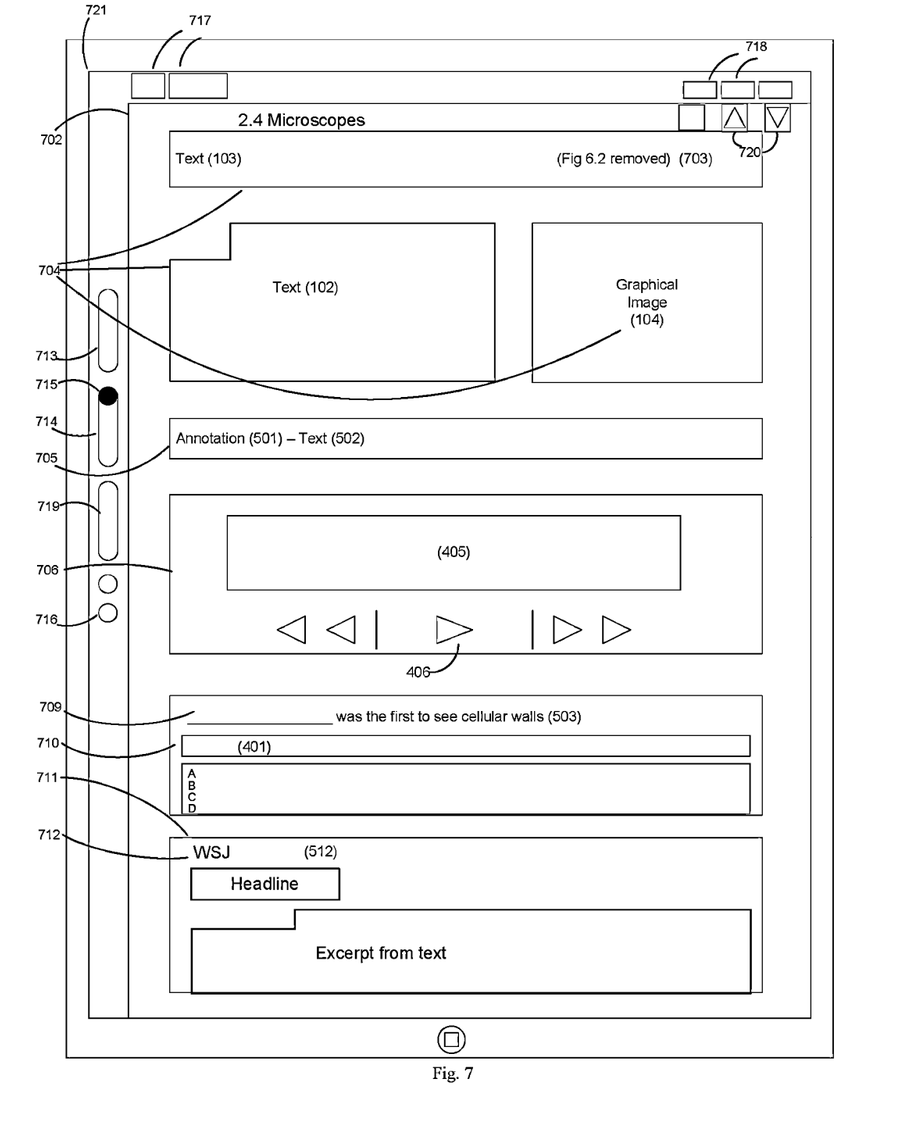
FIG. 7 illustrates sample reading displays that are possible by use of preferred embodiments of the present invention.

FIG. 7 illustrates the effect on the electronic reading device's display 702 as a result of applying the above processes upon the substantive electronic media content illustrated in FIGS. 1 and 4-5. The media objects indicated by 704 correspond to text 103, 102 and images 104 from FIG. 1. This is not to say that a media object must comprise an entire paragraph of text or a whole image, the size and content of the media objects are entirely customizable based on the division step if there was one. It should also be noted that "FIG. 6.2," which was present in FIG. 1 has been removed in the final display 703. The removal of content from a primary source is also contemplated by the present invention, as described above in connection with the division of media objects.

Next, the display shows an annotation 705. This annotation is meant to correspond with annotation 501 and with text 502 in FIG. 5. By strategically locating the annotation within the other text so that its relevance is immediately recognized, the student will more easily incorporate the annotation into his or her learning. Traditionally, such an annotation might be contained within a handout or notes distributed by the instructor; however, when a student reads the notes outside of their intended context, the educational effect may be hampered. The illustrative embodiment of the present invention addresses this deficiency.

Next, the display shows a video 706. The video is meant to correspond with the supplemental content video 404 in FIG. 4. After reading about the properties of microscopes when viewing living cells, a student can watch a video which tangibly demonstrates what one of the properties would look like. A student's practical knowledge of the science can be greatly enhanced and supplemented by this context specific video 706 incorporated into the display 702. A student need only interact with the display 406 to begin the video within the context of the other media objects.

Next, the display shows some assessments. The questions 709, 710 are meant to correspond to the assessment 503 and assessment 401 of FIGS. 5 and 4, respectively. Once again, the strategic placement of formative assessments within a single source of learning content can greatly improve a student's retention of information. M. Yorke, Formative Assessment and its Relevance to Retention, *Higher Education & Development*, Vol. 20 (2001), pages 115-126. Traditionally, a student would have to look to a separate media source, such as a workbook, or the end of a chapter to perform assessments. Alternatively, assessments can be given in the classroom in the form of quizzes, tests, or exams. Although these forms of assessments are also capable of re-enforcing the learning process, there is a need in the art to provide the advantages of assessment without divorcing the questions from the content which is assessed. By providing the assessment questions in the context of the content containing the answer, a student learns what was important about the content. The student's reading comprehension is also immediately supplemented while the content itself is still fresh in his or her mind. Forming this preliminary connection before the student moves on to other topics is important to the learning process and, specifically, improves reading comprehension and recall at the micro-level. Assessments that are further divorced from content, such as workbook exercises, quizzes, tests, and exams are still useful to the learning process in that they further solidify the student's new knowledge.

Finally, the display 702 shows a supplemental article 711. The text of the article 712 is meant to correspond, at least in part, to the article 512 of FIG. 5. This article is meant to bring the preceding content, which might only teach elementary concepts, into the modern and state-of-the-art perspective. The article reinforces the preceding content mostly because the article might assume that the reader has a working knowledge of the preceding content, especially if the article is drawn from a specialized journal. In that case, the student would need a firm grasp of the preceding materials in order to comprehend the article. Alternatively, if the article comes from a lay source, such as a newspaper 712, the preceding content might be briefly reviewed and incorporated in the article within the context of a new discovery or perspective. This would also have an advantageous effect on the learning process by reviewing the content and placing it into a timely and interesting perspective. Finally, such an article can have the advantageous effect of sparking further interest in the preceding subject matter such that the student might perform independent and unassigned research.

The teaching advantages created by the display 702 enumerated above are not meant to be exhaustive, but rather illustrative. The display will provide many other teaching advantages that one skilled in the art will appreciate. Moreover, the teaching advantages enumerated above are not meant to limit the present invention.

The present invention has applicability beyond the teaching environment. Its application to educational electronic media content is merely a preferred embodiment of the invention.

Navigation

The present invention also proposes a novel method of presenting students with a display to facilitate learning and to provide fast and efficient access to a vast amount of electronic media content. This aspect of the invention contemplates that the display on the electronic reading device further comprises at least a first view and a second view wherein a user is allowed to navigate between the first view and the second view. This navigation can be achieved through any arbitrary user interaction with the electronic reading device. For example, if the electronic reading device also includes a touchscreen, touching the screen in a particular manner can alter the display from the first view to the second view or vice versa. Linking the two views with the other aspects of the invention, the present invention contemplates that the first view facilitates interactive navigation by the user within one or more of the media objects and the second view facilitates interactive transitions by the user among the plurality of media objects. Thus, the one or more media objects can be termed a section of the material. The first view is a close-up view of the material to facilitate reading of the material within an individual section. The second view puts the content into context by taking a broader macro-level perspective such that the user can more easily navigate among the sections of media objects. The second view can also provide context to the user by allowing the user to see where the more specific content fits into a larger whole, facilitating content retention.

Figure 8:
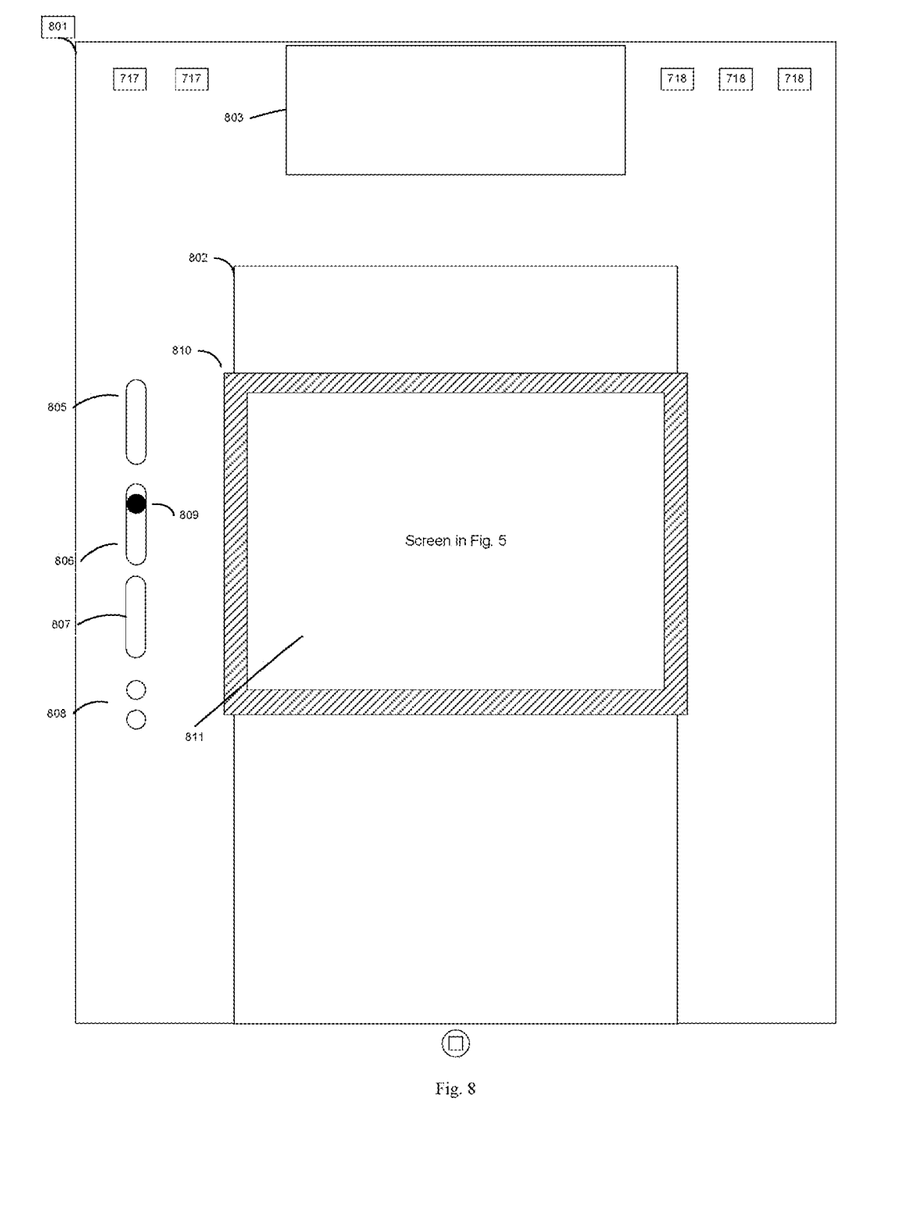
FIG. 8 illustrates a user interface mechanism in one embodiment of the present invention that helps users to efficiently visualize the context of the content currently being displayed, and to adjust which content is displayed.

The display 702 in FIG. 7 illustrates one embodiment of the first view. The display incorporates various micro-controls, such as the ability to jump to the previous or next object in the content sequence 720. There are other controls within the broader display 721 that provide more macro-level control 717, 718. FIG. 8 illustrates one embodiment of the second view. The display incorporates the macro-level controls seen in the first view 717, 718. However, the content display has broader perspective. The section 802 which was partially displayed in FIG. 7 is just a portion of the second view display 801. 811 represents the amount of material that was immediately displayed in the first view. The frame 810 provides a user an easy measure of what he or she would see if the electronic reading device was navigated to the first view. Other sections of material 803 are also displayed in the second view. Thus, the second view facilitates interactive transitions by the user among the sections of media objects. This is not to say that a user cannot scroll through material in the first view, but only that the perspective afforded by the second view gives a user better macro-level control over the display.

The display can also be equipped with various representations and indicia that further facilitate fast and efficient navigation within the electronic media content and general awareness of the present display's position within the content. These include (i) a visual representation of the plurality of media objects, (ii) a visual representation of the sequence of the plurality of media objects, (iii) a visual representation of the relative length of the plurality of media objects, (iv) a visual representation of the display's position within the electronic media content or within a media object, and (v) a visual representation of a transition between media objects or pluralities of media objects. These representations act as proxies for various properties of the electronic media content much like a map is a proxy for geography. Preferably, these representations also facilitate the display of additional data, including the popularity of a given media object, interactions among users that have taken place inside the context of the object, and how much time the user has spent inside that media object.

When it is said that something represents the plurality of media objects, the present invention does not require each media object be individually represented. As explained before, various groups of media objects can be combined into sections, and each section can be represented without any indication of the metes and bounds of the individual media objects. A media object can be arbitrarily small due to the automatic and dynamic division of the electronic media content. Conceivably, a media object can consist of a single letter of text. However, the various representations can group the media objects into sections, which are then the only entities that are directly represented. What is meant by using the term "media object" in the context of visual representations is that the various representations can be made to be as small as individual media objects because a given section can be as small as one media object. Thus, the present invention disavows any construction of the various forms of visual representations to require that each and every media object that was subject to automatic and dynamic sequencing be separately represented. This result is possible under the present invention, but not required.

With this express caveat in mind, the present invention proposes that the display incorporate a visual representation of the plurality of media objects. The simplest form of such a representation can be a set of numbers or letters corresponding to each section. However, any symbol, figure, or configuration of shapes can be a representation. All that is required is that the display shows some proxy for the plurality of media objects. This visual representation can be present in both the first view and the second view mentioned above.

Next, the present invention proposes that the display can incorporate a visual representation of the sequence of the plurality of media objects. Again, the simplest form of such a representation can use numbers or letters to indicate sequence. However, the sequence of the plurality of media objects may also be represented by the geometrical configuration of the representations. For example, the representations can be configured left-to-right or top-to-bottom to indicate the progression. However, any manner of representation can be employed so long as it represents the sequence of the plurality of media objects.

The relative lengths of the plurality of media objects can also be the subject of visual representation. Using numbers or letters to represent the relative lengths would be more difficult, but not impossible. For example, the font size of the individual letters or numbers can correspond with the section's relative length. Preferably, however, the visual representation of the relative length of the plurality of objects uses length itself. This makes the visual representation more intuitive for the user. Thus, bars of various lengths can be used to represent the relative lengths of the plurality of media objects.

Next, the display's current position within the electronic media content and/or the plurality of media objects can be the subject of visual representation. The representation of the display's position within the electronic media can be achieved by any mechanism that emphasizes one section of content over the others. For example, one number in a sequence of numbers can be set in bold type. Likewise, the representation of the display's position within individual sections should emphasize one portion of the section over others. Preferably, this can be done by a dot on a sequence of bars that themselves represent the plurality of media objects.

Finally, there can be a visual representation of transitions among the plurality of media objects. This can be done together with the visual representation of the plurality of media objects, in which case, the preferred embodiment would be a break in the bars representing the individual sections. The transitions can also be represented using the display of the sections directly. Blank areas between sections can be used to indicate transitions between individual sections.

One particular visual representation can be termed a "spine." A spine means one or more bars, each representing an individual section of one or more media objects in a linear relationship to each other. Particular embodiments of spines are illustrated in FIGS. 7 and 8, combining various types of visual representations to create visual representations of the plurality of media objects, their sequence, their relative lengths, and the transitions between sections of media objects. Individual bars 713, 714, 719, 805, 806 and 807 represent individual sections. The lengths of the bars compared with the lengths of other bars represent the relative length of the sections. The lengths of the bars may also represent the length of time a user will spend with a given media object or set of objects, such as time spent reading text, watching video, completing assessments, or other supported media objects, such that the relative bar lengths indicate how much time a user should anticipate spending to fully consume the content being displayed. The positions of the bars from top to bottom, for example, represent the relative sequence of the sections. Breaks in the spine represent transitions between sections. A dot 715, 809 on the bar 714, 806 represents the current display's position within the electronic media content and within the section. The current section is indicated by the bar containing the dot 714, 806. The dot's position within the bar represents the display's current position within the individual section. FIGS. 7 and 8 also demonstrate that not all of the properties of the electronic media content and the plurality of media objects need to be represented for all sections. Other bars 716, 808 may not show the relative lengths of the sections that the bars represent. These bars 716, 808 are present merely to demonstrate that there are further sections in the electronic media content (or in a portion thereof) sequenced later than the current display. These bars can also represent the number of sections left in the present reading assignment. Thus, there may even be more sections of electronic media content that are not displayed using the spine at all.

The above-mentioned alternatives are examples of embodiments of the present invention, and they do not limit the scope of the invention. It is recognized that the present invention may be implemented on a variety of processing platforms and that various fields, values and displays may be used. While there has been described herein what is considered to be the preferred embodiment of the invention, other modifications will occur to those skilled in the art, and it is desired to secure in the appended claims all such modifications as falling within the literal meaning of the following claims and any equivalents thereof.

What is claimed is:
1. A method for use with an electronic reading device connected via a network to one or more remote computer servers, the method comprising:
responsive to user selection, via the electronic reading device, of an educational class or course of study, downloading from the one or more remote computer servers to the electronic reading device a specified list of reading materials corresponding to the selected class or course of study;
automatically determining, by the electronic reading device, which, if any, educational electronic media content of those reading materials specified on the list of reading materials are not already present in memory of the electronic reading device and for which a license is required and has not yet been obtained;
automatically fetching from one or more of the remote servers, by the electronic reading device, selected educational electronic media content determined to be specified on the reading list but not already stored in memory on the reading device, dividing the educational electronic media content into a plurality of media objects, and
automatically obtaining, subject to user authorization of any associated charges, licenses for accessing the selected educational electronic media content; and automatically and dynamically, using the electronic reading device, resequencing the plurality of media objects which comprise the educational electronic media content for presentation on said electronic reading device, the resequencing resulting in a sequence based at least partly on an input sequencing specification and not constrained by an original sequence of the media objects,
wherein presentation on said electronic reading device comprises displaying 1) visual representations of the plurality of media objects in the sequence resulting from said resequencing, the visual representations including a first view of the plurality of media objects that facilitates interactive navigation within one or more of the media objects and a second view of the plurality of media objects that facilitates interactive navigation among the plurality of media objects, wherein those of the plurality of media objects viewable in the first view are represented in the second view, said first and second views further including visual proxies for properties the media objects, a first one of said visual proxies including a spine that includes one or more bars, each bar representing an individual section of plurality of media objects, where the length of each bar informs a user of an anticipated time to fully consume an associated media object, and 2) a break in the educational electronic media content to indicate the transitions among the plurality of media objects and a break in the spine that indicates transitions among the plurality of media objects.

2. The method according to claim 1 wherein said input sequencing specification comprises a reading schedule.

3. The method of claim 1 wherein the input sequencing specification comprises a syllabus.

4. The method according to claim 1 wherein said sequence resulting from said resequencing is based upon a user's interaction with the electronic reading device.

5. The method according to claim 4 wherein said user's interaction comprises compliance with a reading schedule.

6. The method according to claim 4 wherein the user's interaction with the electronic reading device comprises a user's responses to interactive assessment questions.

7. The method according to claim 6 wherein said interactive assessment questions are generated by one or more of: an author, a publisher, an instructor, a student, or other user of the electronic reading device.

8. The method of claim 1 wherein the plurality of media objects is any combination of textbooks or portions thereof, text, numbers, equations, assessments, questions, articles or portions thereof, pictures, photographs, illustrations, figures, images, manipulable objects, videos, animations, sequences of images, 3-D objects, audio files, and annotations.

9. The method of claim 1 wherein interactive navigation between said first and second views is facilitated by one or more of a gesture-based interface, touchscreen, or voice-recognition technology.

10. The method of claim 1 wherein the objects comprising the first one of the visual proxies are arranged in the sequence of the resequenced plurality of media objects.

11. The method of claim 1 wherein the visual representation of the plurality of media objects further comprises a visual representation of what is currently being displayed within the educational electronic media content or the plurality of media objects.

12. The method of claim 11 wherein the objects comprising the first one of the visual proxies comprise indicator on a spine.

13. The method according to claim 1 wherein at least one of the plurality of media objects is protected by digital rights management.

* * * * *